United States Patent
Bar et al.

(10) Patent No.: US 7,168,078 B2
(45) Date of Patent: *Jan. 23, 2007

(54) METHOD AND SYSTEM OF A TRAFFIC CONTROL APPLICATION PROGRAMMING INTERFACE FOR ABSTRACTING THE USE OF KERNEL-LEVEL TRAFFIC CONTROL COMPONENTS

(75) Inventors: Ofer Bar, Raanana (IL); Eric L. Eilebrecht, San Francisco, CA (US); Yoram Bernet, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 14 days.

This patent is subject to a terminal disclaimer.

(21) Appl. No.: 10/846,130

(22) Filed: May 14, 2004

(65) Prior Publication Data

US 2004/0215811 A1 Oct. 28, 2004

Related U.S. Application Data (63) Continuation of application No. 09/157,645, filed on Sep. 21, 1998, now Pat. No. 6,807,667.

(51) Int. Cl.
  *G06F 3/00* (2006.01)
(52) U.S. Cl. .................. 719/320; 719/321
(58) Field of Classification Search ......... 719/313–332
  See application file for complete search history.

(56) References Cited

U.S. PATENT DOCUMENTS

| | | | |
|---|---|---|---|
| 4,768,150 A | 8/1988 | Chang et al. | |
| 5,262,539 A | 11/1993 | Makosza et al. | |
| 5,339,413 A | 8/1994 | Koval et al. | |
| 5,414,650 A | 5/1995 | Hekhuis | |
| 5,440,740 A | 8/1995 | Chen et al. | |

(Continued)

FOREIGN PATENT DOCUMENTS

EP 0 751 461 1/1997

(Continued)

OTHER PUBLICATIONS

RFC: 1633 Intergrated Services in the Internet Architecture: an Overview, Braden, R., et. al., Jun. 1994.*

(Continued)

*Primary Examiner*—Beatriz Prieto
(74) *Attorney, Agent, or Firm*—Wolf, Greenfield & Sacks, P.C.

(57) ABSTRACT

A traffic control application programming interface for abstracting the use of traffic control components to client applications to provide quality of service. The traffic control interface accepts input from a client application and based on that input, communicates with the operating system to control kernel level traffic control components. The client can register with the traffic control interface, and it can open and close interfaces, add, modify, and delete flows on those interfaces, and attach or delete filters on the flows. The client can also obtain data on any currently active interface, flow, or filter. The traffic control interface will send the appropriate message to the operating system, directing that the necessary tasks be performed by either a packet scheduler or a packet classifier. Those kernel level components then return through the operating system the results of the operations requested, and that return data will be passed back to the client application.

22 Claims, 4 Drawing Sheets

U.S. PATENT DOCUMENTS

| | | | |
|---|---|---|---|
| 5,446,736 | A | 8/1995 | Gleeson et al. |
| 5,463,624 | A | 10/1995 | Hogg et al. |
| 5,485,460 | A | 1/1996 | Schrier et al. |
| 5,517,622 | A | 5/1996 | Ivanoff et al. |
| 5,517,635 | A | 5/1996 | Cross et al. |
| 5,517,668 | A | 5/1996 | Szwerinski et al. |
| 5,521,923 | A | 5/1996 | Willmann et al. |
| 5,539,886 | A | 7/1996 | Aldred et al. |
| 5,553,061 | A | 9/1996 | Waggener, Jr. et al. |
| 5,555,264 | A | 9/1996 | Sallberg et al. |
| 5,627,829 | A | 5/1997 | Gleeson et al. |
| 5,648,965 | A | 7/1997 | Thadani et al. |
| 5,724,513 | A | 3/1998 | Ben-Nun et al. |
| 5,752,005 | A | 5/1998 | Jones |
| 5,761,424 | A | 6/1998 | Adams et al. |
| 5,764,894 | A | 6/1998 | Boucher et al. |
| 5,787,430 | A | 7/1998 | Doeringer et al. |
| 5,790,522 | A | 8/1998 | Fichou et al. |
| 5,796,956 | A | 8/1998 | Jones |
| 5,797,031 | A * | 8/1998 | Shapiro et al. ................. 710/8 |
| 5,802,307 | A | 9/1998 | Melo |
| 5,802,511 | A | 9/1998 | Kouchi et al. |
| 5,806,068 | A | 9/1998 | Shaw et al. |
| 5,815,678 | A | 9/1998 | Hoffman et al. |
| 5,815,689 | A * | 9/1998 | Shaw et al. ................. 713/400 |
| 5,815,707 | A * | 9/1998 | Krause et al. ............... 719/321 |
| 5,819,043 | A | 10/1998 | Baugher et al. |
| 5,822,317 | A | 10/1998 | Shibata |
| 5,831,606 | A | 11/1998 | Nakajima et al. |
| 5,831,971 | A | 11/1998 | Bonomi et al. |
| 5,884,037 | A | 3/1999 | Aras et al. |
| 5,889,956 | A | 3/1999 | Hauser et al. |
| 5,903,735 | A | 5/1999 | Kidder et al. |
| 5,913,028 | A | 6/1999 | Wang et al. |
| 5,917,822 | A | 6/1999 | Lyles et al. |
| 5,935,218 | A | 8/1999 | Beyda et al. |
| 5,956,721 | A | 9/1999 | Douceur et al. |
| 5,974,465 | A | 10/1999 | Wong |
| 5,983,278 | A | 11/1999 | Chong et al. |
| 5,987,522 | A | 11/1999 | Rijhsinghani |
| 5,996,013 | A | 11/1999 | Delp et al. |
| 5,996,020 | A | 11/1999 | Reed |
| 6,003,086 | A | 12/1999 | Mitsutake et al. |
| 6,005,866 | A | 12/1999 | Lincoln |
| 6,011,775 | A | 1/2000 | Bonomi et al. |
| 6,021,408 | A | 2/2000 | Ledain et al. |
| 6,031,841 | A | 2/2000 | Woundy |
| 6,047,323 | A | 4/2000 | Krause |
| 6,104,868 | A | 8/2000 | Peters et al. |
| 6,185,574 | B1 | 2/2001 | Howard et al. |
| 6,205,149 | B1 | 3/2001 | Lemaire et al. |
| 6,233,624 | B1 | 5/2001 | Hyder et al. |
| 6,243,753 | B1 | 6/2001 | Machin et al. |
| 6,247,061 | B1 | 6/2001 | Douceur et al. |
| 6,247,067 | B1 | 6/2001 | Berliner et al. |
| 6,378,004 | B1 | 4/2002 | Galloway et al. |
| 6,405,145 | B1 | 6/2002 | Rust et al. |
| 6,807,667 | B1 * | 10/2004 | Bar et al. ................... 719/320 |
| 2003/0076838 | A1 * | 4/2003 | Shaio et al. ............. 370/395.5 |

OTHER PUBLICATIONS

Abstractions for software architecture and tools to support them, Shaw, M., et. al., Software Engineering, IEEE Transaction, vol. 21, issue 24, Apr. 1995, p. 314-335.*

Aggregation of Internet Integrated Service state, Berson, S., Quality of Service, ISBN:0-7803-4482-0, 1998, p. 26-28.*

High Speed IP packet forwarding over the Internet using ATM technology, Esaki, H., Columbia Unic., 1995, p. 1-9.*

An Experimental Implementation of Traffic Control for IP networkd, May, M. & Diot, C., INRIA, 1993, p. 1-11.*

RFC 2211: Specification of the Controlled-Load Network Element Service, Wroclawski, J. , MIT LCS, Sep. 1997, p. 1-19.*

USENIX: A framework for Alernate Queing: Towards Traffic Management by PC-UNIX based Routers, Cho, K., Jun. 1998, p. 1-12.*

Quality of Service Support for IP Flows over ATM, Braun, T. & Giorcelli, S., 1997, p. 1-15.*

Ensuring quality of service for multimedia application in LAN environment, High-Assurance Systems Engineering Workshop, Fahmi, H., et. al., Aug. 1997, ISBN: 0-8186-7971-9, p. 202-207.*

Design and Implementation of an RSVP based Quality of Service Architecture for an Integrated Services Internet, Barzilai, T., et. al., IEEE Journal on selected areas in communications, vol. 16, No. 3, Apr. 1998, p. 397-413.*

The Design of the RSVP, USC/Informatin Sciences Institute, Braden, R., et. al., Jun. 1995, p. 1-20.*

Implementing Real Time Packet Forwarding Policies using Streams, Wakeman, I., et. al., Nov. 1994, p. 1-12.*

A quality of service architecture, ACM SIGCOMM Computer Communication Review, Campbell, A., et. al., vol. 24, Issue 2, Apr. 1994, p. 6-27.*

RFC 1633: Integrated Services in the Internet Architecture: an Overview, Braden, R., et. al., Xerox PARC, Jul. 1994, p. 1-28.*

WMI: What it is . . . Why Driver writers should care, 1998 OSR Open Systems Resources, Inc.

RFC-2209, Resource Reservation Protocol (RSVP), Sep. 1997, available at http://www.faqs.org/rfcs/rfc220.html, pp. 1-18.

An Experimental Implementation of Traffic Control for IP Networks, May, M.; Diot, C., INRIA, BP 1993, pp. 1-11.

A QoS Adaptive Transport System: Design, Implementation and Experience, Campbell, A.; Coulson, G., ACM Multimedia 96, Boston, MA USA, ACM 0-89791-871-1/96/11, pp. 117-127.

RFC-2210, Resource Reservation Protocol (RSVP), Sep. 1997, available at http://www.faqs.org/rfcs220.html, pp. 1-26.

Barr et al., "Network Monitoring System Design", SIGSCE 98, pp. 102-106.

Thekkath et al., "Implementing Network Protocols at User Level", IEEE/ACM Transactions on Networking, vol. 1, No. 5, Oct. 1993, pp. 554-565.

Yuhara et al., "Efficient Packet Demultiplexing for Multiple Endpoints and Large Messages", 1994 Winter USENIX, Jan. 17-21, 1994, San Francisco, California, pp. 153-165.

Doeringer et al., "Routing on Longest-Matching Prefixes", IEEE/ACM Transactions on Networking, vol. 4, No. 1, Feb. 1996, pp. 86-97.

McCanne et al., "The BSD Packet Filter: A New Architecture for User-Level Packet Capture", 1993 Winter USENIX, Jan. 25-29, 1993, San Diego, California, pp. 259-269.

Morrison, "PATRICIA—Practical Algorithm to Retrieve Information Coded in Alphanumeric", Journal of the Association for Computing Machinery, vol. 15, No. 4, Oct. 1968, pp. 514-534.

Fredkin, "Trie Memory", Communications of the ACM, vol. 3, No. 9, Sep. 1960, pp. 490-499.

Baily et al., USENIX Association, "PATHFINDER: A Pattern-Based Packet Classifier", Department of Computer Science, University of Arizona, pp. 115-123.

Gonnet and Baeza-Yates, "Handbook of Algorithms and Data Structures", Addison-Wesley, 1991, pp. 133-143.

Mogul et al., "The Packet Filter: An Efficient Mechanism for User-Level Network Code", 1987, pp. 39-51.

Sedgewick, "Algorithms", Addison-Wesley, 1988, Chapter 17, pp. 245-257.

Floyd et al. ; "Link-Sharing and Resource Management Models for Packet Networks", IEE/ACM Transactions on Networking, vol. 3, No. 4, Aug. 1995.

Floyd, Sally; "Notes on CBQ and Guaranteed Service", Lawrence Berkeley Laboratory, Jul. 12, 1995, pp. 1-3.

Wakeman, I., et al,; "Implementing Real Packet Forwarding Policies Using Streams"; Lawrence Berkeley Laboratory, Nov. 7, 1994, pp. 1-13.

* cited by examiner

METHOD AND SYSTEM OF A TRAFFIC CONTROL APPLICATION PROGRAMMING INTERFACE FOR ABSTRACTING THE USE OF KERNEL-LEVEL TRAFFIC CONTROL COMPONENTS

RELATED APPLICATION

This application is related to and claims priority to co-pending U.S. patent application Ser. No. 09/157,645, entitled "METHOD AND SYSTEM OF AN APPLICATION PROGRAM INTERFACE FOR ABSTRACTING NETWORK TRAFFIC CONTROL COMPONENTS TO APPLICATION PROGRAMS," filed Sep. 21, 1998, now U.S. Pat. No. 6,807,667 of which the present application is a continuation.

FIELD OF THE INVENTION

The present invention relates generally to controlling communications in a computer network, and more specifically, relates to an application programming interface (API) for use in abstracting network traffic control components to application programs.

BACKGROUND OF THE INVENTION

Over time, the usefulness and benefits of stand alone computing devices, such as the ubiquitous personal computer, have been leveraged by allowing many of such computing devices to communicate with one another over a communications network. Network communication between computers allows many different kinds of applications to exist that are otherwise not possible with a stand-alone computer.

For communicating over a network, information that is to be transported from one computer to another is divided into a number of network communication packets. These network packets (also known simply as "packets") will eventually be transported across the physical communications network. In the PC environment, transmission is handled by a network interface card residing in the personal computer. Throughout this application the PC environment will be assumed, though the discussion and application of the concepts apply to many different network computing environments as will be appreciated by those skilled in the art.

Delays due to network traffic had little impact on the quality of service for the first types of network applications; namely file transfer and messaging applications. Currently, multimedia applications have streaming data, such as successive sound or video, that is communicated from one computer to another. Streaming data typically refers to a continuous set of successive packets that, in order to be processed correctly at the receiving computer, must have certain guaranteed transmission characteristics. Streaming data must be processed at a certain rate, and that rate must be maintained over the network connection. Additionally, there is a limitation on the amount of variability between when successive packets are received. Should the rate and variability requirements not be met, packets will not be received and processed appropriately by the receiving computer and perceptible errors will occur. For example, a video frame may be lost or temporarily frozen if there is some sort of interruption in the stream of packets being processed.

In order to assure a certain quality of service, reservation of network bandwidth or other relevant resource is required. A number of different protocols have been developed, such as RSVP and ATM, for making bandwidth reservations on all nodes that would be in charge of carrying network communication packets between the source and destination nodes. In this manner, once the bandwidth reservations are made, the packets may be sent as part of a data stream, or packet flow, from the source node to the destination node with the assurance of a certain quality of service due to bandwidth reservations.

While these protocols generally work for their intended purpose, there are a number of disadvantages associated with their use. For example, owing to the lack of uniformity across the protocols, there exists no relatively simple manner by which traffic control parameters can be verified, queried, or set. Additionally, it is not desirable to have many different application programs attempting to communicate with one another so as to determine the necessary classifications and schedules to maintain quality of service for the various packets to be sent.

SUMMARY OF THE INVENTION

To overcome these deficiencies in the prior art, the present invention is generally directed to a method and system for abstracting the interface with network communication traffic control components. In this manner, a simple interface is provided that isolates applications from the complexity of the various traffic control configurations, remains consistent regardless of the underlying network media, and provides applications with the ability to easily verify, query and set traffic control parameters.

The invention consists of a traffic control interface which resides at the user level and acts to abstract the control of kernel level traffic control components to user level application programs. The traffic control interface accepts input from a client application and assigns an identification to the network traffic unit sent by the client. The client itself is a network traffic unit, as are any interfaces the client seeks to open, any flows the client wishes to add on those interfaces, and any filters the client wants to attach to those flows. Once the traffic control interface has identified the network traffic unit, it will send the appropriate message to the operating system, directing that the necessary tasks be performed by either a packet scheduler or a packet classifier. Those kernel level components can return through the operating system the results of the operations requested, and that return data will be received by the current invention and passed back to the client application.

Additional features, advantages and objects of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE PREFERRED EMBODIMENTS

Figure 1:
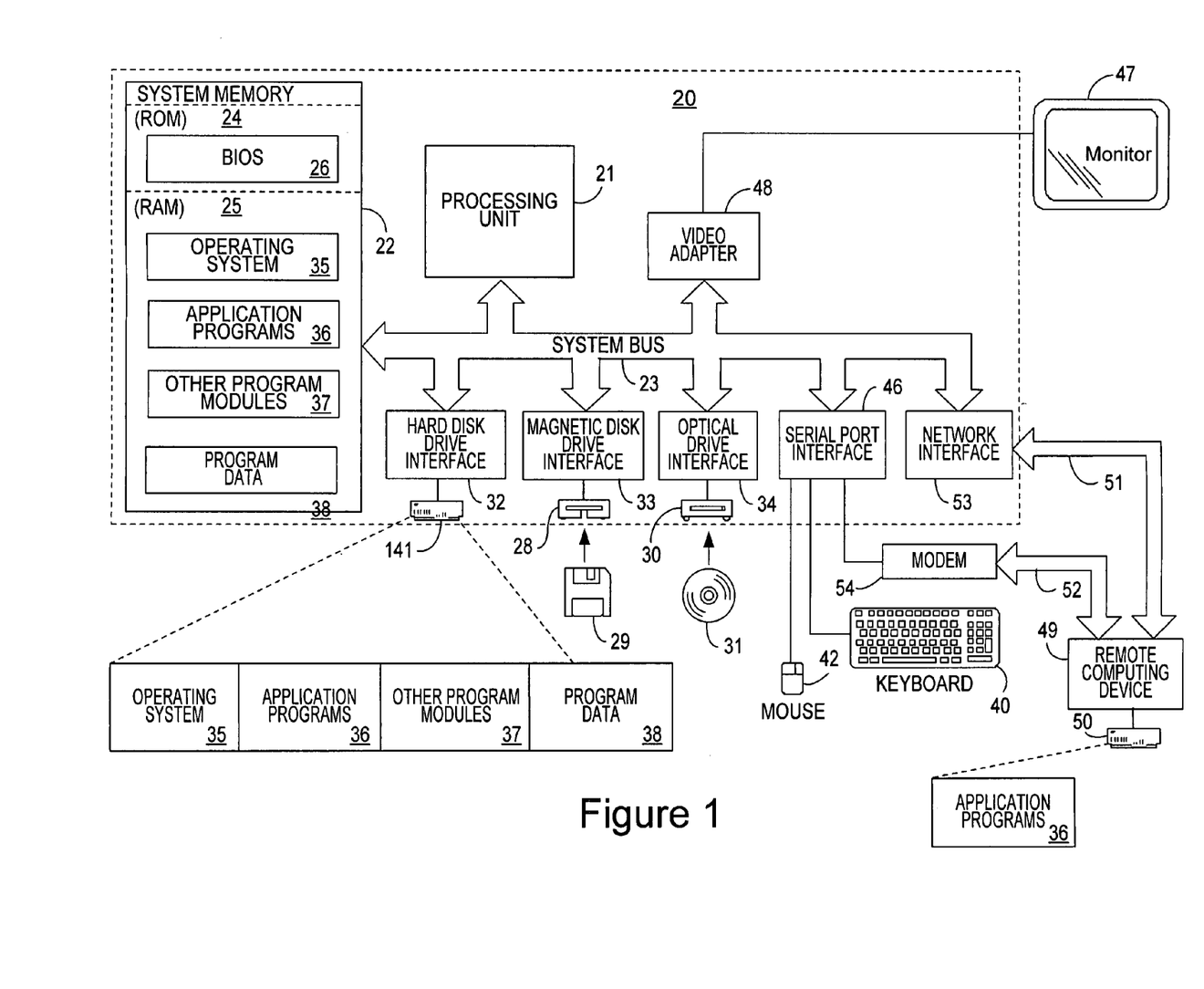
FIG. 1 is a block diagram generally illustrating an exemplary computer system on which the present invention resides.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures the system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to removable optical disk 31 such as a CD ROM or other optical media. The hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices enterprise-wide computer networks, intranets and the Internet. When used in a LAN networking environment, the personal computer 20 is connected to the local network 51 through a network adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representatives of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting, as those of skill in the art will appreciate that various of the acts and operations described hereinafter may also be implemented in hardware.

Figure 2:
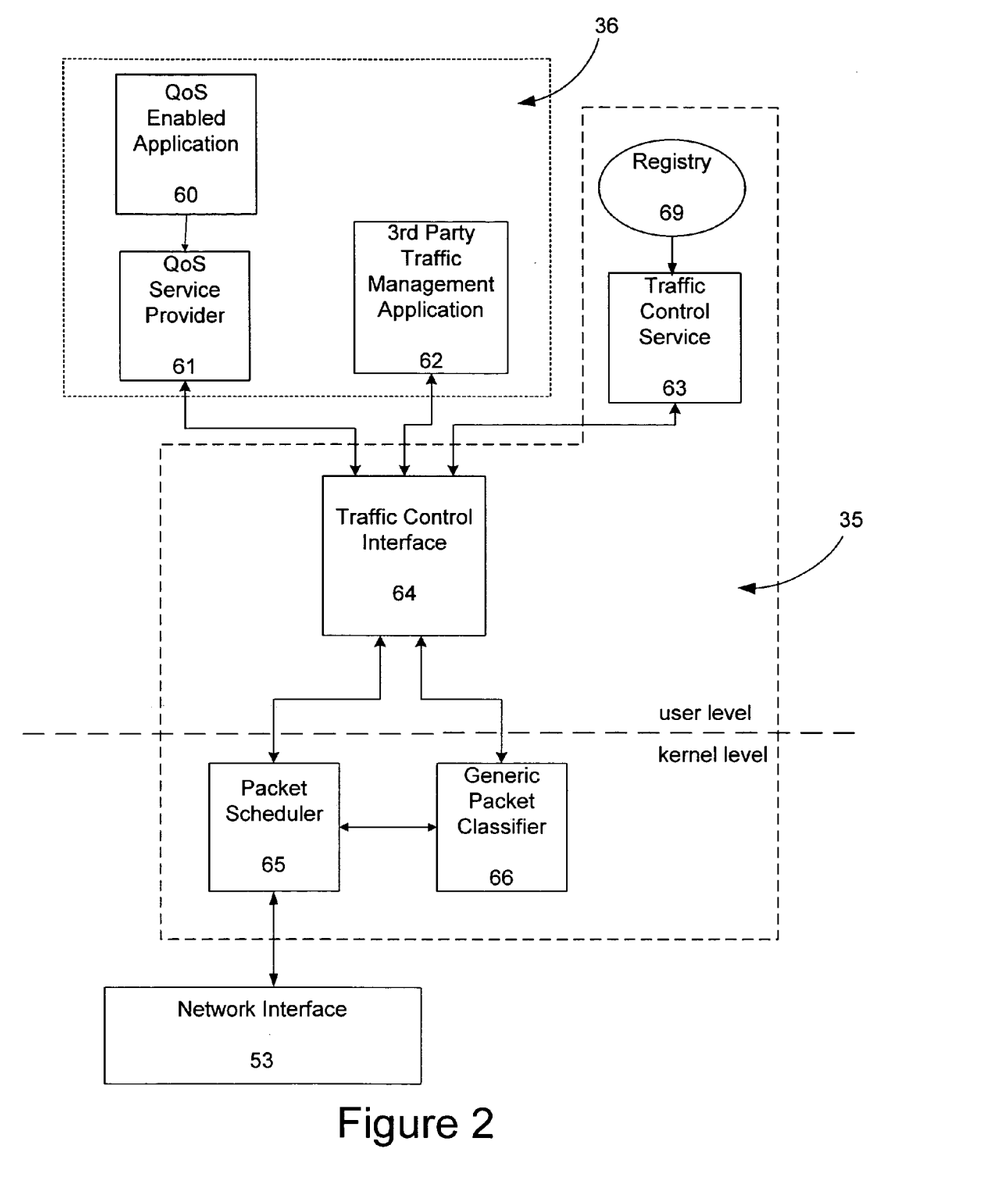
FIG. 2 is a block diagram generally illustrating the various components with which the present invention communicates.

With reference to FIG. 2, the components by which the application programs interface with the networked environment are shown. Generally, the components include application programs 36 and operating system components 35, together with a network interface 53, or a modem 54 (not shown). More specifically, the components include a Traffic Control Interface (TCI) 64, residing at the user level, that acts to abstract the kernel level operating system components responsible for network control. The Quality of Service (QoS) Enabled Application 60 is a third party application that interfaces with the TCI 64 by means of a QoS Service Provider 61. The QoS Service Provider 61 allows for programs not specifically written to take advantage of the TCI 64 to still have some traffic control, thus maintaining some quality of service. Third Party Software with Traffic Management Capabilities 62 is software written by third party programmers specifically to provide an interface between their, or someone else's, software and the TCI 64. The software 62 interfaces directly with TCI 64. Traffic Control Service 63 is an operating system application which controls the flow of necessary status packets such as those which verify the existence of a connection, a host on the other end, or other essential network maintenance.

At the kernel level, the traffic control components include a Packet Scheduler 65 and a Generic Packet Classifier 66. Generally, the Packet Scheduler 65 determines the earliest time at which packets can be sent out and still conform to their quality of service requirements. The Generic Packet Classifier 66 acts as a central location for storing reference patterns necessary to classify packets, thereby eliminating redundancies and increasing efficiency. For more information regarding the Packet Scheduler and the Generic Packet Classifier, the reader is referred to U.S. patent application Ser. No. 09/099,045 entitled "Method and Computer Program Product for Scheduling Network Communication Packets Originating from Different Flows Having Unique Service Requirements" filed on Jun. 9, 1998 by Douceur, Bernet, Bar, Bell, Tai, and Yavatkar and U.S. patent application Ser. No. 08/933,868 entitled "Method and Computer Program Product for Classifying Network Communication Packets Processed in a Network Stack" filed on Sep. 19, 1997 by Douceur, Bernet, and Bar, which are incorporated herein by reference in their entirety. The traffic control components 65 and 66 interface with the network through a Network Interface 68 such as the network adapter 53 or the modem 54.

The TCI 64 calls various application programming interfaces (APIs) to accomplish its function. An API is a set of routines in the operating system 35 which an application program 36 can call and request to carry out functions. A dynamic-link library (DLL) is an API routine that user-mode applications access through ordinary procedure calls. An exemplary DLL provided in the "WINDOWS NT" 5.0 brand operating system is the traffic.dll, which implements the current invention, the TCI 64.

Figure 3:
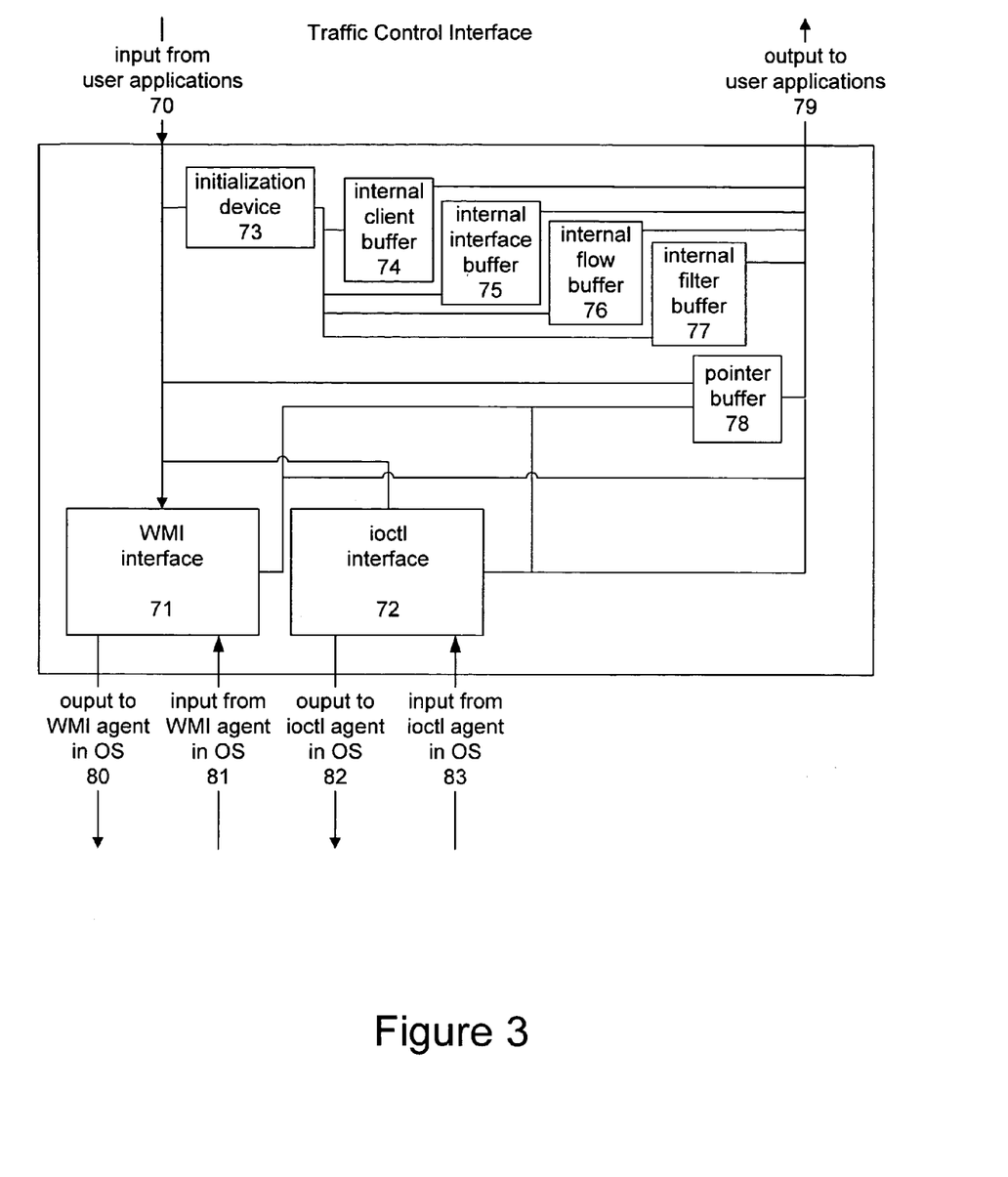
FIG. 3 is a block diagram generally illustrating the present invention.

The TCI 64 is shown in more detail in FIG. 3. The input 70 contains either command elements, which will be used to control the Packet Scheduler 65 or the Packet Classifier 66, or elements managing network control units, such as clients, interfaces, flows, and filters. Command elements of the input 70 are sent to either the Windows Management Instrumentation (WMI) interface 71, or to the input/output control (ioctl) interface 72. These two interfaces use the WMI standard or the ioctl standard, respectively, to communicate with the operating system 35. The operating system 35, in turn, communicates with the Packet Scheduler 65 and the Packet Classifier 66, specifically, the ioctl standard is used to communicate with the Packet Classifier 66, and the WMI standard is used for the Packet Scheduler 65, or any other traffic control driver. Also, the WMI interface 71 and the ioctl interface 72 receive response data back from the Packet Scheduler 65 and the Packet Classifier 66, through the operating system. Elements of the input 70 which manage the network control units are handled by the initialization device 73 and stored in the internal client buffer 74, the internal interface buffer 75, the internal flow buffer 76, or the internal filter buffer 77, depending on whether the network control unit is a client, an interface, a flow, or a filter.

As will be described in more detail later, each client of the TCI 64 will be assigned an identification by the initialization device 73. Similarly, each interface the client opens, each flow installed on that interface, and each filter applied to the flows will be assigned identification by the initialization device 73. The client identification will be stored in the client buffer 74, the interface identification will be stored in the interface buffer 75, the flow information will be stored in the flow buffer 76, and the filter information will be stored in the filter buffer 77. In addition, some elements of the input 70 will point to external buffers for storage of data requested of the TCI 64 by the client application 36. As will be shown in more detail later, the TCI 64 will return requested data in these external buffers. The pointer buffer 78 will store the pointer to these external buffers, when it is received from the client application 36, and then return it to the client 36 on return of the data.

To establish a network connection, an application program 36, first registers as a client of TCI 64. To register with the TCI 64, the application 36 utilizes an API to send to the TCI 64 a registration message having data representative of a TCI version, a client registration context, and client handlers. In response to the registration message, the TCI 64 returns to the application 36 a receipt acknowledge message having data representative of a client handle pointer. The TCI version is the version of the TCI 64 expected by the application 36. The client registration context is a client registration context that will be returned when the client's notification handler is called, and the client handlers are a list of client supplied handlers which can be used by the TCI 64 for notification events and for asynchronous completions. The initialization device 73 assigns to the new client a client identification, known as a client handle. This identification is then stored in the internal client buffer 74. The client handle pointer returned by the TCI 64 to the application 36 is a pointer to a location in which the TCI 64 will place the client handle from internal client buffer 74. In this manner, a communication link is established between the application 36 and the TCI 64.

Once the application 36 has registered as a client of the TCI 64, it can open an interface. An interface is an entity over which traffic control can be invoked. Generally, an interface corresponds to a hardware network connection. However, one piece of hardware can have multiple interfaces, if connected to multiple locations. An interface is the logical connection, rather than the hardware. The TCI 64 can enumerate the existing interfaces, and allows client applications to open or close an interface. It is important to note that the TCI 64 and client application 36 exchange the same interface information regardless of the network media type (LAN, WAN, ATM, etc.) underlying the interfaces. Before the client application 36 can open or close an interface, it needs the interface name, which may be obtained by enumerating interfaces. The client application 36 utilizes an API to send to the TCI 64 an enumerate interfaces message having data representative of a client handle and a buffer size pointer. In response to the enumerate interfaces message, the TCI 64 returns to the application 36 a receipt acknowledge message having data representative of a buffer size pointer and an interface buffer pointer. The client handle is checked against the client handles stored in the client buffer 74, and thus identifies the client, and the buffer size pointer is a parameter which, on input, indicates the size of the buffer allocated by the client application 36 and on return indicates the number of bytes actually written to the buffer. The pointer buffer 78 receives the information from the buffer size pointer and then sends it through to the output, together with the pointer to the buffer where the data requested by the application 36, in this case the interface data, is stored. The interface buffer pointer returned to the client 36 is a pointer to the buffer allocated by the client application 36 to hold the returned list of interface descriptions. The interface descriptions themselves are obtained by the TCI 64 through the use of the WMI interface 71. The WMI interface will send a WMI query to every traffic control driver including the Packet Scheduler 65, through the operating system 35, asking for the all the available interfaces. The Packet Scheduler 65 will return WMI data containing all available interfaces. The returned WMI data, or response data, will be passed by the operating system 35 to the TCI 64, where it will be deciphered by the WMI interface 71, and then placed by the TCI 64 into the buffer allocated by the client 36.

Once the client has this list pointed to by interface buffer pointer, it can open an interface. The client application 36 utilizes an API to send to the TCI 64 an open interface message having data representative of an interface name, a client handle, and an open interface parameter. In response to the open interface message, the TCI 64 returns to the application 36 a receipt acknowledge message having data representative of an interface handle pointer. The interface name is the name of the interface to open, as obtained by the client 36 from the interface buffer pointer above, the client handle identifies the client, as described above, and the open interface parameter is a parameter provided by the client application 36 to the TCI 64, which the TCI 64 can then use when referring to the opened interface. The TCI 64 will use the initialization device 73 to assign an identification to the interface to be opened. This identification, or interface handle, will be stored in the internal interface buffer 75. From the interface buffer 75, the TCI 64 will place the interface handle into a location pointed to by the interface handle pointer, which the TCI 64 will return to the client 36. This interface handle should be used to refer to the opened interface in subsequent calls. The TCI 64 will also use the WMI interface 71 to send a WMI command through the operating system 35 to the Packet Scheduler 65 that the specified interface be opened. Should an error occur at the hardware level, Packet Scheduler 65 will return a WMI message indicating that there was an error, through the operating system 35, which will be deciphered by the TCI 64, through the use of the WMI interface 71. The TCI 64 will then forward the message to the user application 36.

Closing an interface is much simpler. The client application 36 utilizes an API to send to the TCI 64 a close interface message having data representative of an interface handle. The TCI 64 will compare the interface handle to those stored in the interface buffer 75, and thus identify the interface. As before, any errors will be sent by via the operating system 35 in a WMI message to the TCI 64 which will use the WMI interface 71 to decipher them and send them to the client 36. The TCI 64 will also delete the interface from the internal interface buffer 75. Before closing an interface, the client application 36 should close all flows on the interface and all filters attached to those flows. Flows and filters will be discussed in more detail later.

User applications 36 of the TCI 64 can obtain various traffic control related parameters for any open interface and can also set traffic control related parameters on open interfaces. Traffic control related parameters are set on an interface-by-interface basis. These parameters can include: the available bandwidth on the interface, the best-effort bandwidth, the reservable bandwidth, the default shaping mode for the interface, the latency, the media type on which the interface exists, the number of flows installed on the interface, a list of traffic control parameters supported by the interface, the non-best effort bandwidth, the supported scheduling profiles list, and the current scheduling profile. To obtain traffic control related parameters, the user application 36 utilizes an API to send to the TCI 64 a query traffic control message having data representative of an interface handle, a traffic control parameter identifier, a notify change boolean, and a buffer size parameter. In response to the query traffic control message, the TCI 64 returns to the application 36 a receipt acknowledge message having data representative of a buffer size parameter and a buffer pointer. The interface handle is used as before, the traffic control parameter identifier is the identifier to the particular traffic control parameter which the application 36 asked for, the notify change boolean is a Boolean variable which if set to true requires the TCI 64 to notify the client application 36 of future changes in the particular traffic control parameter queried, and the buffer size parameter is a parameter which indicates the size of the buffer allocated by the client 36 on input, and on output it indicates the number of bytes actually written to the buffer. As before, the TCI 64 will store the buffer size parameter in the pointer buffer 78, and then send it back out with the pointer to the buffer containing the information requested. The buffer pointer is the pointer to the buffer allocated by client 36, which holds the returned data. The TCI 64 will use the WMI interface 71 to send through the operating system 35, to the Packet Scheduler 65, a WMI message asking for the particular parameter queried by the client 36. The Packet Scheduler 65 will send response data, namely a WMI message containing the value of the parameter request, which will be passed through the operating system 35 to the TCI 64, translated by the WMI interface 71, and then placed in the buffer pointed to by the buffer pointer sent to the client 36.

To set traffic control properties, the application 36 utilizes an API to send to the TCI 64 a set traffic control message having data representative of an interface handle, a traffic control parameter identifier, a buffer size parameter, and a buffer pointer. As before, the interface handle identifies the interface, the traffic control parameter identifier identifies the traffic control parameter which the application 36 seeks to set, the buffer size parameter is a parameter which indicates the size of the buffer allocated by the client 36, and the buffer pointer is a pointer to the buffer allocated by client 36, which holds the returned data. The TCI 64 will take the traffic control parameter identifier and use the WMI interface 71 to send through the operating system 35 to the Packet Scheduler 65 a WMI message setting the particular parameter as requested by the client 36. The operating system 35 will return a WMI message from the Packet Scheduler 66 containing an acknowledgment, which will be translated by the WMI interface 71 and then placed in the buffer pointed to by the buffer pointer sent by the client 36.

Once the application 36 is registered as a client of TCI 64, and has opened an interface, it can install flows. A flow is a series of related packets transmitted over the network. The TCI 64 does not actually install the flows itself. The TCI 64 installs a flowspec, which is a description of the flow. It does not install the actual packets themselves. To add descriptions of the flows the client 36 wants installed, the client 36 utilizes an API to send to the TCI 64 a flow description install message having data representative of an interface handle, a client flow identifier, and a flow description element. As before, the interface handle is used to identify the interface. The client flow identifier is assigned to the flow description as an identification by the client 36 and can be used by the TCI 64. The TCI 64 also assigns the flow description its own identification, the flow handle, through the use of the initialization device 73. This flow handle is then stored in the internal flow buffer 76. The flow handle can be subsequently used by the TCI 64 when referring to the installed flow description. The flow description element contains the components of the flow description the client wants installed. The components of a flow description include the flow properties such as the token bucket parameters to which a flow's traffic will be shaped, the priority assigned to a flow's packets relative to other flows' packets, the 802.1p traffic class marked in the header of a flow's packets, the precedence bits in the IP header of a flow's packets, and the DTR settings in the IP header. In response to the flow description install message, the TCI 64 returns to the client 36 a receipt acknowledge message having data representative of a flow handle pointer which is a pointer to the location in which the TCI 64 will return the flow handle for use in subsequent calls. The TCI 64 will use the ioctl interface 72 to send through the operating system 35, to the Packet Classifier 66, an ioctl request to open a flow on the specified interface. The Packet Classifier 66 will create the flow and then communicate with the Packet Scheduler 65 via a kernel interface to install the flow on the interface. If an error occurred, the Packet Classifier 66 can respond with an ioctl message via the operating system 35 to the TCI 64, which will pass the message to the client 36, if necessary.

Clients of the TCI 64 can also modify or delete existing flow descriptions. One method of modifying a flow description is for the client application 36 to utilize an API to send to the TCI 64 a modify flow description message having data representative of a flow handle and a flow values pointer. The flow handle is the handle, or identification, assigned to the flow description by the initialization device 73. The TCI 64 will take the flow handle and compare it to values stored in the internal flow buffer 76 and thus identify the flow description. The flow values pointer is a pointer to a structure which describes the flow values as the client application 36 wants them modified. The pointer buffer 78 will store the flow values pointer and direct the TCI 64 to the buffer to find the flow values. The TCI 64 will use the ioctl interface 72 to send to the Packet Classifier 66, via the operating system 35, an ioctl message containing the flow parameters the client 36 modified, and the new values of those flow parameters. The Packet Classifier will change the values and can respond with an ioctl message if there was an error, through the operating system 35, which will be translated by the ioctl interface 72, and sent by the TCI 64 to the client 36, if necessary.

One method for deleting a flow description involves the application 36 utilizing an API to send to the TCI 64 a delete flow message having data representative of a flow handle. As above, the flow handle will be compared with the flow handles stored in the internal flow buffer 76 and thus used to identify the flow description. The TCI 64 will then use the ioctl interface 72 to send an ioctl message to the Packet Classifier 66, through the operating system 35, requesting that the specific flow be deleted. As before, the Packet Classifier 65 may return an ioctl message to indicate an error, which will be translated by the ioctl interface 72, and if necessary passed to the client 36 by the TCI 64. The TCI 64 will also delete the flow handle from the internal flow buffer 76. Before deleting a flow description the client application 36 should delete all filters attached to the underlying flow. Adding and deleting filters will be discussed in more detail later.

Client applications also have the ability to query flow properties, retrieve a flow name, or enumerate the existing flows. To retrieve a flow name, the client application 36 utilizes an API to send to the TCI 64 a retrieve flow name message having data representative of a flow handle and an output string size. In response to the retrieve flow name message, the TCI 64 returns to the client 36 a receipt acknowledge message having data representative of a flow name buffer. The flow handle is used as was described above, and the output string size is the simply the size of the output string set aside by the client 36. The flow name buffer is the output buffer which holds the flow name. The TCI 64 will use the ioctl interface 72 to send to the Packet Classifier 66, via the operating system 35, an ioctl message asking for the name of the particular flow identified by the client 36. The Packet Classifier 66 will send response data, through the operating system 35, containing the flow name in an ioctl message, which will be interpreted by the ioctl interface 72 and then placed in the flow name buffer.

Another method of obtaining the flow name is to enumerate all currently existing flows. The client application 36 utilizes an API to send to the TCI 64 an enumerate flows message having data representative of an interface handle, an enumeration handle, a requested flows parameter, and a buffer size pointer. In response, the TCI 64 returns to the application 36 a receipt acknowledge message having data representative of a flows parameter, a buffer size pointer, and a buffer pointer. The interface handle is used as was described above, the enumeration handle is the enumeration handle maintained by the system and is a pointer to an internal state, the requested flows parameter is a parameter which, on input, points to a number which is the requested number of flows and on output, points to a number which is the number of flows actually returned in the buffer pointed to by buffer pointer, and the buffer size pointer is a parameter which points to the size, in bytes, of the buffer allocated on input, and on return points to the size of the buffer as actually written. The parameters of the requested flows and the buffer size pointer are stored by the pointer buffer and then used by the TCI 64 in the return message to the client 36. The buffer pointer is a pointer to the buffer which contains an element for each flow. The buffer pointer is assigned by the pointer buffer 78. Each element in the buffer contains the total item size in bytes, the process D of the flow installer, the flow name, the flow length, generic flow data, and the number of generic filters attached to this flow and their content. The TCI 64 uses the ioctl interface 72 to send through the operating system 35, to the Packet Classifier 65, an ioctl message asking for all the open flows and information on each of those flows. The Packet Classifier 65, via the operating system 35, will send response data to the TCI 64 containing an ioctl message containing all of the open flows and the corresponding information, which the ioctl interface 72 will translate and then the TCI 64 will store the data into the buffer pointed to by the pointer buffer sent to the client 36.

With the flow name, flow properties can be obtained from the TCI 64. The client application 36 utilizes an API to send to the TCI 64 a query flow properties message having data representative of a flow name, a flow property identifier, and a buffer size pointer. In response to the query flow properties message, the TCI 64 returns to the client 36 a receipt acknowledge message having data representative of a buffer size pointer and a buffer pointer. The flow name is the flow name as returned either from retrieving a flow name, or querying flow properties, the flow property identifier is the identifier corresponding to the particular property of the flow which the application is asking for, and the buffer size pointer indicates the size of the buffer allocated by the calling application 36 on input and the number of bytes actually written to the buffer on return. The TCI 64 will use the pointer buffer 78 to store the buffer size pointer, and then use it when it returns a message to the client 36. The flow property identifier will be passed to the WMI interface 71, and the WMI interface 71 will send a WMI message to the Packet Scheduler 65, through the operating system 35, requesting the flow property specified. The Packet Scheduler 65 will send response data, via the operating system 35, containing a WMI message containing the flow property, which the WMI interface 71 will decipher and then the TCI 64 will place the result in the buffer pointed to by the buffer pointer sent to the client 36. The buffer pointer is a pointer to a buffer allocated by the calling application 36 to hold the returned data, namely the flow properties. The pointer buffer 78 will also store the buffer pointer for return to the client 36.

Client applications also have the option of adding filters onto flows. Filters include a pattern and a mask which specify the set of packets which should be directed to the flow to which the filter is attached. The pattern specifies the value of parameters which should be matched, and the mask specifies those parameters themselves, and their sub-fields. Several filters can be attached onto a single flow, however each filter can only be attached to one flow. In one method of adding a filter onto a flow, the client application 36 utilizes an API to send to the TCI 64 an add filter message having data representative of a flow handle and a filter description. In response to the add filter message, the TCI 64 returns to the client application 36 a receipt acknowledge message having a filter handle pointer. The flow handle is processed as before, and the filter description describes the filter to be installed, namely the pattern and mask. The TCI will use the initialization device 73 to assign the filter an identification, or filter handle, and then store that in the internal filter buffer 77. The filter handle will be placed in a buffer to which the output filter handle pointer points to. The TCI 64 will also use the ioctl interface 72 to send an ioctl message through the operating system 35 to the Packet Classifier 66 requesting that the filter specified by the client 36 be attached to the specified flow. If there was an error, the Packet Classifier 66 can return an ioctl message via the operating system 35 which will be interpreted by the ioctl interface 72, and sent to the client 36, if necessary, by the TCI 64.

To delete a filter, the application 36 utilizes an API to send to the TCI 64 a delete filter message having data representative of a filter handle. The filter handle is compared to the filter handles stored in the internal filter buffer 77, and thus identifies the filter. The TCI 64 will then use the ioctl interface 72 to send, via the operating system 35, to the Packet Classifier 66 an ioctl message requesting that the filter be deleted. If an error occurred, the Packet Classifier 66 can return, via the operating system 35, an ioctl message to the TCI 64, which will be interpreted by the ioctl interface 72 and sent by the TCI 64 to the client 36, if necessary. The TCI 64 will also delete the filter handle from the internal filter buffer 77.

Once the client application 36 has finished sending data, it can deregister. Before deregistering, the client 36 should close all of the interfaces which have been opened with that particular client's handle. As was discussed earlier, closing an interface requires closing all of the flows on that interface and all of the filters attached to those flows. The client application 36 seeking to deregister utilizes an API to send to the TCI 64 a deregistration message having data representative of a client handle. The client handle is used as before to identify the client. The TCI 64 will then delete the client handle from the internal client buffer 74.

Figure 4:
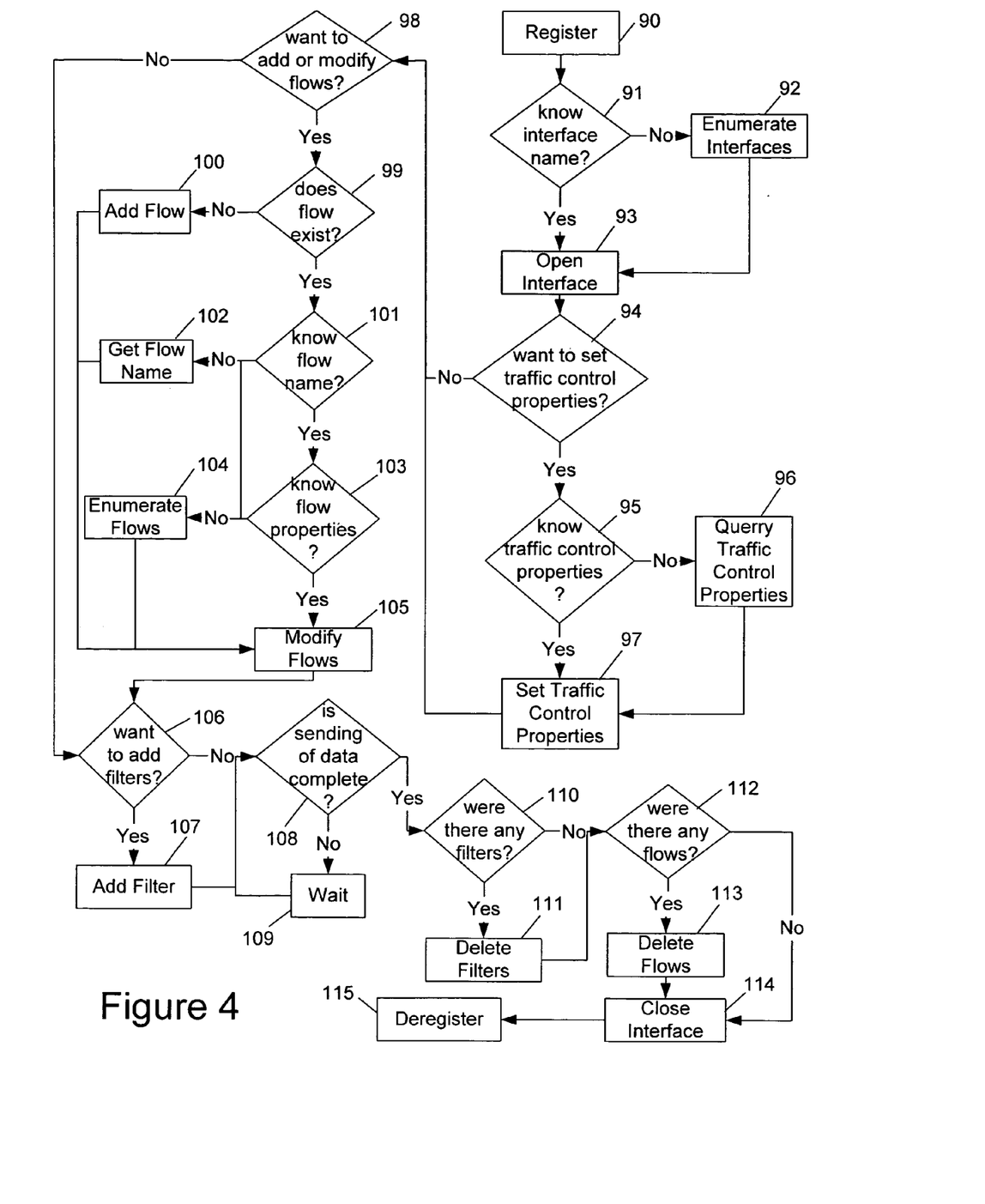
FIG. 4 is a flow diagram generally illustrating an exemplary interaction between a user application and the present invention.

An exemplary interaction between a client application 36 and the TCI 64 is shown in FIG. 4. The exact interaction will vary depending on the goals of the client application 36, as will be appreciated by those skilled in the art. At step 90 the client application 36 registers with the TCI 64. If the client 36 knows the interface name at step 91, it can proceed to open that interface at step 93; if not, the client 36 can call enumerate interfaces at step 92 to find the interface name. If the client 36 then wishes to set traffic control properties at step 94, it can proceed to step 95 where, if it knows which traffic control properties it wishes to set, the client application 36 can proceed to step 97 and set the traffic control properties. If the client 36 does not know the traffic control properties, it can query them at step 96. Once the client is done setting traffic control properties, or did not wish to set them, it can proceed to step 98 and add or modify flows if desired. If the client 36 wishes to modify a flow, and that flow is found not to exist at step 99, then the client can add the flow at step 100. If the flow does exist, the client 36 can check to see if it knows the flow name at step 101. If the client 36 does know the flow name, it can proceed, but if not, it can get the flow name at step 102, or can get the flow name by enumerating flows at step 104. If the client 36 knows the flow properties it wants to modify at step 103, it can proceed to step 105 and modify the flow, if it does not, then it can enumerate flows at step 104. Once the client 36 is done adding flows or modifying them, or if it did not wish to add or modify flows, it can proceed to step 106 and add a filter onto a flow if desired. Adding a filter is accomplished at step 107. If the client 36 did not wish to add filters, or it is done adding them, it can determine whether it is done sending data at step 108. If the sending of the data is complete, the client 36 can proceed to end its interaction with the TCI 64. If the data is not done being sent, then client can wait at step 109. In ending its interaction with the TCI 64, the client 36 can delete filters at step 111 if it determines that there were some at step 110, and it can delete flows at step 113 if it determines there were some at step 112. Finally, the client can close the interface at step 114, and deregister at step 115.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   a network connection for sending and receiving data;
   an application program for creating data to be sent through the network connection;
   a traffic control component linked to the network connection for classifying and scheduling the sending of the data through the network connection; and
   a traffic control interface for abstracting the control of the traffic control component to the application program;
   wherein the traffic control interface further comprises instructions for enumerating the traffic control properties of an interface in the traffic control component for the application program.

2. The computer of claim 1 wherein the traffic control component further comprises a Packet Scheduler.

3. The computer of claim 1 wherein the traffic control component further comprises a Generic Packet Classifier.

4. The computer of claim 1 wherein the traffic control interface further comprises instructions for registering the application program as a client application of the traffic control interface.

5. The computer of claim 1 wherein the traffic control interface further comprises instructions for opening an interface in the traffic control component for the application program.

6. The computer of claim 1 wherein the traffic control interface further comprises instructions for closing an interface in the traffic control component for the application program.

7. The computer of claim 1 wherein the traffic control interface further comprises instructions for setting the traffic control properties of an interface in the traffic control component for the application program.

8. The computer of claim 1 wherein the traffic control interface further comprises instructions for opening a flow in the traffic control component for the application program.

9. The computer of claim 1 wherein the traffic control interface further comprises instructions for closing a flow in the traffic control component for the application program.

10. The computer of claim 1 wherein the traffic control interface further comprises instructions for modifying a flow in the traffic control component for the application program.

11. The computer of claim 1 wherein the traffic control interface further comprises instructions for getting a flow name from the traffic control component for the application program.

12. The computer of claim 1 wherein the traffic control interface further comprises instructions for enumerating flows in the traffic control component for the application program.

13. The computer of claim 1 wherein the traffic control interface further comprises instructions for setting flow properties in the traffic control component for the application program.

14. The computer of claim 1 wherein the traffic control interface further comprises instructions for creating a filter in the traffic control component for the application program.

15. The computer of claim 1 wherein the traffic control interface further comprises instructions for deleting a filter in the traffic control component for the application program.

16. The computer of claim 1 wherein the traffic control interface further comprises instructions for deregistering from the traffic control interface the application program.

17. A computer-implemented method for providing network traffic control to a first application program assigned and a second application program sending data over a network connection comprising the steps of:

receiving a second control instruction specifying the interface identifier from the second application program; and aggregating data from the first application program and the second application program on an interface capable of network traffic control that is identified by the interface identifier;

wherein the first control instruction and the second control instruction include an install flow request.

18. The method of claim 17, wherein the first control instruction includes an install flow request having the interface identifier that installs a first flow on the interface identified by the interface identifier and the second control instruction includes another install flow request having the interface identifier that installs a second flow on the interface identified by the interface identifier.

19. The method of claim 17, wherein the first control instruction and the second control instruction include a query request which queries a traffic control parameter of a flow installed on the interface identified by the interface identifier.

20. The method of claim 17, wherein the first control instruction and the second control instruction include a set request which sets a traffic control parameter of a flow installed on the interface identified by the interface identifier.

21. The method of claim 17, wherein the first control instruction includes an install filter requesting having a flow identifier that installs a first filter on a flow installed on the interface identified by the flow identifier and the second control instruction includes another install filter request having the flow identifier that installs a second filter on the flow identified by the flow identifier.

22. A computer-readable medium having computer-executable instructions for performing the steps of:

receiving a first control instruction specifying an interface identifier from a first application program;

receiving a second control instruction specifying the interface identifier from a second application program; and aggregating data from the first application program and the second application program on an interface capable of network traffic control that is identified by the interface identifier;

wherein the first control instruction and the second control instruction include an install flow request.

* * * * *